3,470,493
LASER ENERGY PUMP WHICH EMPLOYS AN EXTENSION OF A COAXIAL TRANSMISSION LINE
Daniel E. Altman and Myer Geller, San Diego, Calif., assignors to the United States of America as represented by the Secretary of the Navy
Filed Oct. 18, 1966, Ser. No. 588,251
Int. Cl. H01s 3/02
U.S. Cl. 331—94.5          11 Claims The invention described herein may be manufactured and used by or for the Government of the United States of America for governmental purposes without the payment of any royalties thereon or therefor.

This invention relates to an improved method and means for exciting laser material. The exchange or transfer of energy which causes a laser material to absorb in its excitation spectrum has been referred to as an energy pump operation. The present invention more specifically conceives the use of a particular laser assembly configuration to excite a selected laser material so that in effect the laser assembly produces spontaneous emission and is employed as an energy pump relative to the laser material.

The concept of the present invention contemplates the use of an assembly of the so-called "transmission line" laser configuration to enclose and efficiently excite a selectively matched laser material. In this manner a more effective transfer of useable energy is accomplished, a higher repetition rate may be realized, and certain disadvantages of prior art methods and equipments may be obviated.

Known prior art lasers have conventionally used flash lamps as a source of excitation energy. Typical of such flash lamps are those filled with xenon gas. Such a conventional xenon flash lamp may meet a broad spectrum of energy ranging generally from 3,000 A. to approximately 15,000 A. Most of this emitted energy is in the visible and the near infrared spectral regions.

When a typical liquid chelate is used as the laser material to be excited by the transfer of energy, it will be found that most such liquid chelates absorb principally in the blue and the ultraviolet region of the spectrum. As a result, only a relatively small amount of the energy developed by the conventional xenon flash lamp is usefully employed for pumping energy to such a liquid chelate.

Accordingly, it is a primary object of the present invention to provide a means and equipment for more efficiently effecting the transfer of energy to a laser material.

An equally important object of the present invention is to provide a means of exciting a laser material which operates in a manner that will permit relatively high pulse repetition frequencies in operation.

Another prime object of the present invention is to provide an arrangement whereby a radiant energy source having desirable emission characteristics may be employed to efficiently pump energy to a laser material of matched absorption and excitation characteristics.

Another object of the present invention is to provide an arrangement for transferring energy to a laser material which may be readily adapted to eliminate the heat problem which was inherent in prior art arrangements employing flash lamps.

Yet a further object of the present invention is to provide an energy pump in which the emissive material employed as the source of pumped energy is adaptable to be circulated in a continuous flow to remove radiated heat from the radiantly emissive material.

It has been discovered that through the use of the "transmission line" type or configuration of nitrogen gas laser assembly strong spontaneous emission bands of energy may be generated which substantially coincide or fall within the spectral absorption and excitation ranges of typical liquid chelates. The concept and several embodiments of the transmission line laser are disclosed in our copending application Ser. No. 588,249, titled "Transmission Line Gas Laser" and filed Oct. 18, 1966.

Accordingly, by matching the spontaneous emission bands of a transmission line nitrogen gas assembly to those of a selected liquid chelate, a more efficient transfer of energy can be achieved. This, of course, contemplates and implies the use of nitrogen gas as an energy pump to transfer excitation radiation to the chelate laser material. Moreover, because of the configuration made possible by the application of the transmission line principles, a liquid laser material in the form of a selected chelate, may be conveniently enclosed within an appropriate cell fabricated of material such as quartz, for instance, which is substantially transparent to the transfer of energy between the excitation source and the liquid laser.

The liquid laser cell is enclosed within a second larger chamber which may similarly be formed of quartz and the nitrogen gas is contained within the larger chamber so as to surround the liquid laser material. The larger chamber is preferably designed to be of a configuration which substantially constitutes a continuation of the transmission line and having a desired precalculated distributed impedance in accordance with the concept and teaching of our copending application, previously mentioned. As is disclosed in that copending application, a characteristic operative feature of the transmission line gas laser configuration is a significantly higher rise time of the rate of current change in the conductive path which is completed through the gas. As a result, efficient excitation of the gas is achieved, making possible a desirably higher pulse repetition frequency. It is to be understood, however that the excitation may be a spontaneous emission as contrasted to a lasing action. Accordingly, by matching the spontaneous emission spectral bands of the gas enclosing the liquid laser material to the absorption and excitation spectral bands of the liquid laser material, a desirably efficient transfer of energy is achieved between the two materials and a proficient operation of the laser material, such as a liquid chelate, is realized.

In its fundamental form the energy pump of the present invention may comprise a cell containing a laser material having a determinable excitation spectrum and enclosed within an appropriate cell which is substantially transparent to energy of wavelengths in the excitation spectrum. A larger chamber is provided enclosing the cell and having a material therein surrounding the cell, the emission characteristics of which are selected to include substantial spectral portions of coincident wavelenth relative to the excitation spectrum of the laser material.

At least two electrically conductive electrodes are provided and mounted on the outer chamber so as to communicate with the enclosed material. A transmission line is connected to a source of electrical energy and an appropriately controllable switch means is arranged to connect the transmission line in circuit with the electrodes so as to complete an electrical path through the enclosed material such as nitrogen gas causing it to emit energy which in turn excites the inner laser material.

These and other advantages, features and objects of the the present invention will be more fully appreciated from an understanding of the concept of the present invention as embodied in illustrative examples described hereinafter.

In the drawings:

FIG. 1 is a graphical illustration of the absorption spectrum of a typical liquid chelate laser material;

FIGS. 2 and 3 graphically illustrate the excitation spectra for several liquid chelates;

Figure 1:
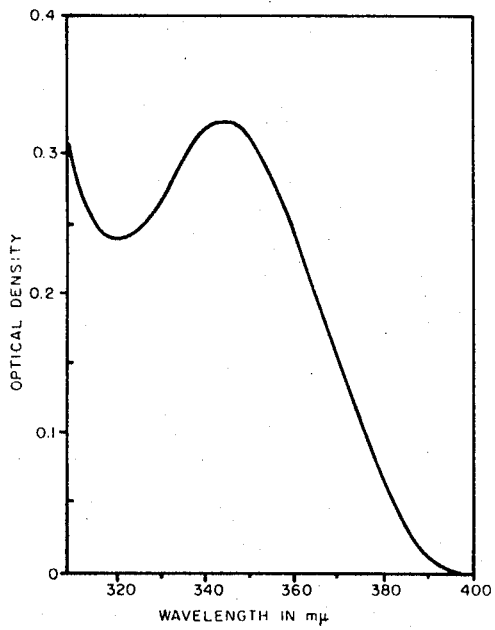
Figure 2:
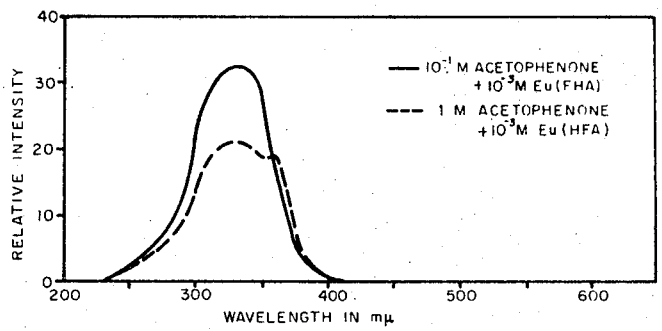
Figure 3:
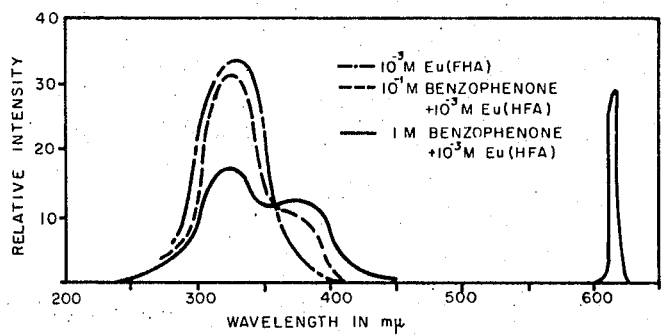

In FIG. 1, the absorption spectrum of a liquid chelate in the form of europium tristhenoyltrifuoractetonate ($3H_2O$) in epoxy resin at room temperature indicates absorption bands principally in the wavelength regions of 300 to 390 millimicrons. The absorption spectra of several additional and differing concentrations of comparable liquid chelates are shown in FIGS. 2 and 3 as indicated by the associated legends relating to the graphical illustrations. Here too, it will be seen that the principal spectral regions of the activation curve lie in the 300 to 400 millimicron region and especially in the 300 and 350 millimicron region.

Figure 4:
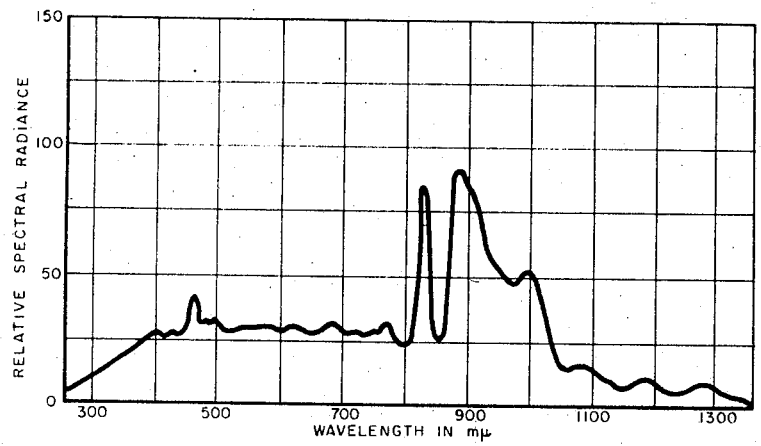
FIG. 4 is a graphical illustration of the spectral emission generated by a high pressure xenon lamp.

Contrasted to these characteristics, the illustration of FIG. 4 shows the spectral emission that may be realized from a typical conventional prior art high pressure xenon lamp. Though useable spectral radiance is realized from approximately 300 millimicrons to 1300 millimicrons, the greatest concentrations of radiant energy are generated in the 800 to 1000 millimicron regions. Thus, as is known in the prior art, the radiative characteristics of the xenon is not particularly well matched to the absorption characteristics of liquid chelates, for example, of the types illustrated in FIGS. 1, 2 and 3.

Since a typical liquid chelate will absorb in the blue and the ultraviolet region of the spectrum, it is highly desirable to match the radiative characteristics of the energy source to this absorptive excitation spectral region. For greatest efficiency, to minimize typical heat problems, and related disadvantages resulting from undesirable mismatch, it may be observed that generally the most desirable spectral region for exciting a liquid chelate lies between the 330 and 340 millimicron region and that the overall region of 250 to 400 millimicrons can be useful.

It has been found that the radiation from a coaxial transmission line type of gas laser assembly and more particularly that the spontaneous emission of nitrogen will emit strong lines of energy from the second positive band at 337.1 millimicrons, 357.7 millimicrons, 353.7 millimicrons, 375.6 millimicrons, 380.5 millimicrons and in several additional lines from 250 to 400 millimicrons.

Figure 5:
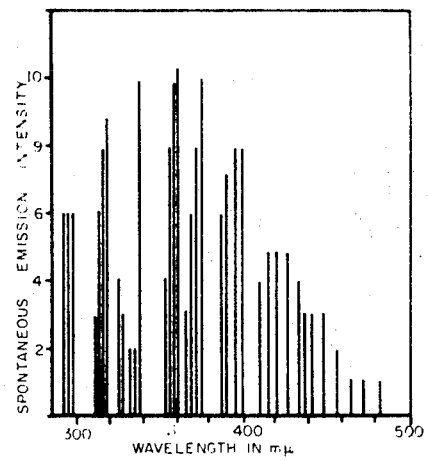
FIG. 5 is a graphical illustration of the principal bands of radiation obtained from spontaneous emission of nitrogen gas.

These desirable spontaneous emission characteristics are graphically illustrated in FIG. 5. As indicated in FIG. 5, the emission spectra occurs mainly in the spectral match between this emission band and the excitation spectra of chelates.

When the nitrogen gas discharge is operated in the pulsed, high current mode of a coaxial transmission line type device, almost all of the radiant energy is emitted in this second positive nitrogen band. Experiments indicate that only a small amount of the total radiant energy goes into another band, i.e., the first positive group, a band which is principally in the infrared. These results have been corroborated by other pulsed spectral measurements on nitrogen. Accordingly, the radiant energy that is generated by spontaneous emission of a coaxial transmission line nitrogen gas type of laser assembly can be absorbed and utilized in a transfer of energy to a liquid chelate.

The advantages of the coaxial or transmission line type of gas laser assembly as taugh and disclosed in our copending application include a highly desirable sharp rise time in current and a relatively efficient transfer of energy during a short current pulse which makes high pulse repetition rates realizable. It will be recognized by those who are knowledgeable in the prior art that the conversion of electrical energy to ultraviolet radiation in nitrogent gas laser is about 1% as reported by D.A. Leonard, Applied Physics Letters, 1965 and E. T. Gerry, Applied Physics Letters, 1965. By contrast, a xenon flash lamp as a significantly higher conversion efficiency. However, because of the poor spectral match of the radiated energy of the xenon flash lamp to the liquid chelate, the overall effective efficiency of the nitrogen gas laser pump is significantly greater than that of the xenon lamp.

Figure 6:
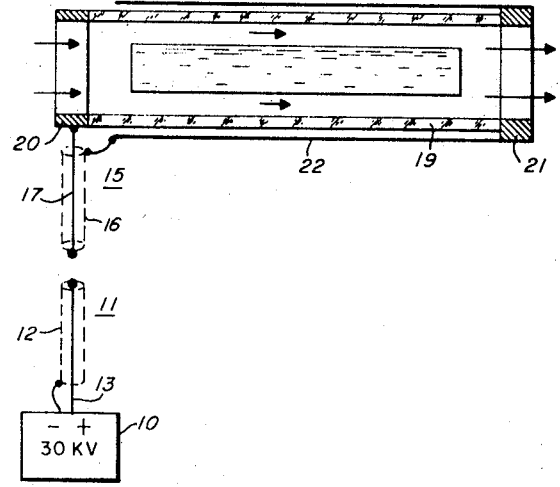
FIG. 6 is a partially cross-section illustration of an embodiment of the present invention.

An embodiment of the concept of the present invention is illustrated in FIG. 6. A source of electrical energy 10 is shown in FIG. 6 as being connected to a schematically represented pulse forming storage line 11 which may comprise a transmission line in the form of a coaxial cable. The coaxial cable transmission line has an outer conductor 12 which may be substantially at ground potential and an inner conductor 13 connected to the high potential side of the electrical source 10.

The inner conductor 13 is connected at its other terminal point to an appropriately controllable electrical switch means such as a coaxial spark gap as indicated at 14. An appropriate connecting line is provided to the other side of the switch means 14 to connect the switch to the unique laser assembly of the present invention. This connecting conductor may take the form of another length of coaxial line 15 comprising an outer conductor 16 and an inner conductor 17.

The laser assembly of the present invention as illustrated in FIG. 5 includes a laser material which may be a liquid chelate contained within a quartz cell 18. Surrounding the liquid chelate is a chamber consisting of appropriate material such as quartz tubing 19 which has mounted thereon at least two ring electrodes as shown at 20 and 21 configured and mounted to communicate with the interior of the quartz chamber 19.

The ring electrode 20 is connected to the inner conductor of the length of coaxial line 15. The other ring electrode 21 is connected through an electrically conductive sheath 22 to the outer conductor 16 of the coaxial line 15. In operation, when the switch means 14 becomes conductive as, for instance, by reason of the poential in the coaxial transmission line 11 building up to a sufficient amplitude to break down the spark gap, a high potential is impressed upon the ring electrode 20 while a low potential (substantially or nominally at ground potential) is present at the ring electrode 21. The enclosing sheath 22, being of conductive material, causes the assembly to operate in the manner of an extension of the coaxial transmission line.

Accordingly, in effect, when the gas material such as nitrogen becomes conductive, the wavefront of conduction and radiation proceeds down the chamber 19 which discloses the liquid chelate cell so that the electrical path through the gas operates in the manner of a central conductor of a coaxial line. The outer sheath or conductor 22 completes the coaxial configuration of the assembly and facilitates matching the assembly in the manner of a determinable distributed impedance so as to afford the most desirable operation.

Since, as previously described, the spontaneous emission spectral bands of nitrogen gas are desirably matched to have substantial portions coincident with the activation or excitation spectrum of the laser material contained within the inner cell, a relatively highly efficient transfer of such energy takes place, exciting the liquid chelate in the inner cell and causing it to emit in its characteristic spectral regions.

As those skilled in the art will readily recognize, the liquid chelate cell must be fabricated of material which is substantially transparent to those wavelengths of energy which it is desired to transmit from the excited gas to the liquid chelate contained in the cell. Similarly, it is desirable that the outer chamber 19, including the quartz tubing, ring electrodes, 20 and 21, and appropriate electrical connections, be of such material as is transparent within selected wavelength regions.

It may also be desirable that the electrically conductive sheath 22, which is part of the laser cell assembly, be highly optically reflective so as to redirect light energy back into the cell area. As previously described, a primary function of the outer conductor 22 is to simulate a coaxial transmission line section by coaction as a conduuctive path together with the excited gas.

One of the significant advantages inherent in the concept of the present invention is that the emissive gas in the form of nitrogen may be continuously circulated through the chamber 19 so that high pulse repetition frequencies may be realized. Moreover, the unique concept does not require that the gas be excited to a lasing action to emit monochromatic, coherent light, but operates well in the region of spontaneous emission.

Figure 7:
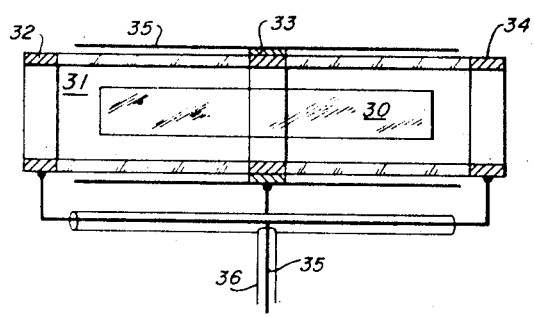
FIG. 7 is a cross-sectional illustration of a variant embodiment of the present invention.

FIG. 7 illustrates an alternative or variant embodiment of the present invention showing a laser assembly wherein a liquid chelate material is contained within a cell 30 of appropriate material such as quartz tubing and enclosed within a chamber 31. The chamber 31, in turn contains a gas such as nitrogen surrounding the liquid laser material contained within the cell 30.

The chamber 31 is fitted with three ring electrodes mounted thereon as shown at 32, 33 and 34, and communicating with the interior of the chamber 31. The outer or end electrodes 32 and 34 are connected to the high tension or central conductor 35 of a switched source of electrical energy. The remaining centrally located electrode 33 is connected to the low or ground potential outer conductor 36 of the same switched source of electrical energy.

All three ring electrodes 32, 33 and 34 are adapted to communicate conductively with the interior of the outer chamber 31 so as to make electrical contact with the gas contained therein. Upon being pulsed with the high potential electrical energy, a conductive wavefront is caused to occur which travels from the outer or end electrodes 32 and 34 toward the central electrode 33. In a manner previously described, the matched spontaneous emission spectral bands of the gas material, such as molecular nitrogen, transfer a maximum amount of energy to an appropriately chosen liquid chelate laser material contained within the cell 30.

As described in our previously mentioned copending application, alternative arrangements such as that illustrated in FIG. 7, or similar assemblies having a plurality of electrode connections communicating with the gas laser interior, may be adapted to particular needs within the spirit and teaching of the present invention.

In the embodiment of FIG. 7, the central electrode 33 also is in connection with a conductive sheath 35 which, as previously explained in the description of the embodiment described in FIG. 6, may desirably be of a highly optically reflective material, as well as being electrically conductive to perform its function in substantially the manner of an outside conductor of a section of coaxial line.

It will be readily appreciated by those knowledgeable in the laser arts that although the conversion of electrical energy to ultraviolet radiation by means of a nitrogen gas realized is at a relatively low efficiency level, the total effective efficiency of the concept of the present invention is significantly better than the xenon flash lamp.

Moreover, all gases (including nitrogen and xenon) require a certain period of time after an electrical discharge before they can be efficiently pulsed again. The conventional xenon flash tubes, as employed in the prior art, were generally sealed so that they comprised a physically closed system. As a result, considerable time (of the order of ten milliseconds or greater), was required to allow the flash tube sufficient time to dissipate the heat from the gas and to permit the gas to relax to its "ground" state before it could be pulsed again.

The present invention lends itself readily to a continuous flow of emissive gas to thereby remove the heat and also that gas which has not equilibrated of itself. This technique accordingly adapts to the realization of high repetition rates further increasing the overall efficiency made possible through the concept and teaching of the present invention.

A most important aspect of the teaching of the present invention is that the primary emissive material, such as nitrogen gas, need not be raised to a level of laser action but rather will perform well in substantially the type of configurations disclosed when caused to spontaneously emit energy, a state which is much more easily achieved than that of monochromatic or coherent emission in a lasing action.

Obviously many modifications and variations of the present invention are possible in the light of the above teachings. It is therefore to be understood that within the scope of the appended claims the invention may be practiced otherwise than as specifically described.

What is claimed is:
1. A laser energy pump comprising:
   a cell containing a laser material having a determinable excitation spectrum;
   said cell being substantially transparent to energy of said excitation spectrum;
   a chamber enclosing said cell and having a second material therein surrounding said cell, the emission characteristics of said second material including substantial spectral portions of coincident wavelength relative to said excitation spectrum of said laser material;
   at least two electrodes mounted on said chamber in electrical contact with the second material at separated positions;
   a transmission line connected to a source of electrical energy; and
   switch means arranged to connect said transmission line in circuit with said electrodes, whereby to complete an electrical path through said second material so that the electrical path and said electrodes operate in the manner of an extension of said transmission line causing said second material to emit energy which excites said first laser material.
2. A laser energy pump as claimed in claim 1 wherein said second material is a selected gas.
3. A laser energy pump as claimed in claim 2 wherein said laser material is a liquid chelate.
4. A laser energy pump as claimed in claim 3 wherein said selected gas is nitrogen.
5. A laser energy pump as claimed in claim 4 wherein the electrical path completed through said nitrogen gas causes spontaneous emission of said nitrogen gas.
6. A laser energy pump as claimed in claim 4 wherein nitrogen is circulated in a continuous flow path including said chamber.
7. A laser energy pump as claimed in claim 1 wherein said electrodes comprise first and second electrodes, said first elecerode being connected to the high potential of said transmission and said second electrode being connected to the low potentional of said transmission line.
8. A laser energy pump as claimed in claim 7 wherein said second electrode is connected to an electrically conductive sheath substantially enclosing said chamber.
9. A laser energy pump as claimed in claim 8 wherein said conductive sheath is an optically reflective material.
10. A laser energy pump as claimed in claim 9 wherein said transmission line comprises coaxial cable.
11. A laser energy pump as claimed in claim 10 wherein said circuit including said conductive path through said second material is adapted to operate substantially as a continuous transmission line of predetermined distributed impedance.

References Cited

UNITED STATES PATENTS

| | | |
|---|---|---|
| 3,166,673 | 1/1965 | Vickery et al. |
| 3,225,307 | 12/1965 | Weissman. |
| 3,253,226 | 5/1966 | Herriott et al. |
| 3,265,989 | 8/1966 | Gürs. |
| 3,309,620 | 3/1967 | De Ment. |
| 3,319,183 | 5/1967 | Lempicki et al. |
| 3,387,227 | 6/1968 | Mastrup et al. |
| 3,405,372 | 10/1968 | Brecher et al. |

OTHER REFERENCES

Geller et al.: "A Pulsed, Coaxial Transmission Line Gas Laser," Journal of Applied Physics, vol. 37, pp. 3639–40, August 1966.

RONALD L. WIBERT, Primary Examiner

E. BAUER, Assistant Examiner

U.S. Cl. X.R.

313—231; 315—111; 333—83, 97